United States Patent Office 3,483,008
Patented Dec. 9, 1969

3,483,008
METHOD OF PREPARING A WATER-SOLUBLE PROTEIN LOTION
John S. Herr, Whittier, Calif., assignor, by mesne assignments, to Daniel A. Naeve, La Canada, Calif.
No Drawing. Filed Aug. 1, 1966, Ser. No. 569,044
Int. Cl. C08h 7/00; A61k 7/06
U.S. Cl. 106—161                                11 Claims

ABSTRACT OF THE DISCLOSURE

A lotion prepared by beating liquid egg white to produce a foam which includes some free liquid in which water-soluble proteins are dissolved, separating the liquid from the foam, and mixing the liquid with benzyl alcohol.

---

This invention relates to novel lotions which contain water-soluble proteins.

The lotions of this invention are for use in liberal application to the face and hair by men and women of any age to beautify both skin and hair. It is also useful for the following purposes:

(1) As an antiseptic and topical anesthetic for conditions of acne, athlete's foot, ringworm, and minor skin irritations;

(2) As an antiseptic and topical anesthetic underarm deodorant;

(3) As a semigloss or gloss coating for nut shells of nuts and for nutmeats out of the shell;

(4) As a semigloss or gloss coating for vitamin, mineral, or drug tablets;

(5) As a protein solution for food use; and (6) As a coating for fingernails and eyelashes to make the nails smoother so nail polish will spread easier and be more attractive when dry, and to enhance the body and appearance of eyelashes.

The lotion of this invention is a solution of water-soluble proteins, such as ovalbumin, conalbumin, and other natural proteins derived from raw egg white (dried or liquid) from which the naturally occurring ovomucoid and ovomucin have been removed sufficient to provide for the desirable and satisfactory characteristics of the lotion of this invention for the uses listed above. The ovomucoid and ovomucin in egg white are responsible for the stringy, mucous-like character of raw egg white which makes egg white untreated in accordance with this invention undesirable for use as a protein lotion.

Prior to this invention, protein lotions have been used for cosmetic purposes. However, generally such lotions have the disadvantage of being expensive, and drying to a flaky or granular consistency on the skin or other surface to which it is applied. The protein lotion of this invention does not either disadvantageously flake or granulate after drying, and is less expensive than the lotions previously available.

The water-soluble protein lotion of this invention is prepared by beating liquid egg white to produce a foam which includes some free liquid in which water-soluble proteins are dissolved. A substantial portion of the undesired ovomucoid and ovomucin is held up in the foam. The liquid is separated from the foam to form the lotion of water-soluble proteins with substantially less ovomucoid and ovomucin present that naturally occurs in egg white.

In the preferred form of the invention, the liquid egg white is added, prior to beating, to a water solution of a preservative for protein. Preferably, the liquid egg white is poured rapidly into the water solution of liquid preservative while the liquid preservative solution is being beaten or agitated. Beating is continued until the mixture has a stiff, foamy consistency, with free liquid present with dissolved proteins in it. The foam and free liquid mixture is permitted to stand for a sufficient length of time to effect a substantial separation of the liquid from the remaining foam. The separation can be speeded by the use of a centrifuge. The foam retains undesired ovomucoid and ovomucin, and is discarded. The liquid contains the desired water-soluble proteins which are included in the lotion of this invention.

The preservatives not only extend the shelf life of the lotion, but also act as plasticizers so that the lotion dries free of a disadvantageous flaky or granular texture, and without appearing to be oily or sticky. Examples of preservatives and plasticizers used in the lotion are benzyl alcohol, methylparaben, and propylparaben. Other preservatives and plasticizers can be used, as well understood by those skilled in the art, and additional examples are given in the following detailed description of the invention.

EXAMPLE I

| Ingredient: | Quantity, grams |
|---|---|
| Liquid egg white | 960.00 |
| Water | 480.00 |
| Benzyl alcohol | 16.00 |
| Methylparaben | 1.25 |
| Propylparaben | .1 |

The water, benzyl alcohol, methylparaben and propylparaben are mixed together to form a water solution of preservative and plasticizer for the water-soluble proteins to be extracted from the egg white. The water solution of the preservative and plasticizers is beaten or agitated at a high enough speed to produce a foam. During this agitation, the egg white is poured rapidly into the water solution of preservative and plasticizer. Beating is continued until the egg white is beaten to a stiff consistency. During this beating step, the preservative and plasticizer are thoroughly dispersed throughout the stiff foam to prevent degradation of the protein in the egg white. The stiff foam mixture is allowed to stand for several hours. During the standing time, the plasticized and preserved water-soluble protein in the free liquid portion of the foam separates by gravity from the more stable portion of the foam, and is decanted for packaging or use. The remaining foam retains the undesired ovomucoid and ovomucin, and is discarded.

Instead of liquid egg white, dried egg white can be used. For example, five to six ounces of dried egg white mixed with one quart of water produces a reconstituted liquid egg white having approximately the same composition as that naturally occurring in eggs.

Although not entirely critical, the amount of preservative and plasticizer is preferably in the proportion given above. However, the benzyl alcohol can vary from about 1% to about 3% by weight of the liquid egg white. The methylparaben can vary between about 0.1% and about 0.3%, and the propylparaben between about .01% and about .03% by weight of the liquid egg white. The use of the methylparaben and propylparaben in combination has a synergistic effect on preserving the lotion and plasticizing it during drying.

The lotion made in accordance with Example I is suitable for liberal use on the hair and skin, as an antiseptic and topical anesthetic for treating acne, athlete's foot, ringworm, and minor skin irritations, and as an antiseptic and topical anesthetic underarm and body deodorant.

For convenience of reference, the location prepared in Example I is referred to hereinafter as Formula A.

EXAMPLE II

| Ingredient: | Quantity, cc. |
|---|---|
| Formula A | 120 |
| Water | 120 |
| Glycerin | 5 |

The above ingredients are mixed merely by gentle stirring without beating. Preservatives in the same proportions as in Example I may be included in the water of this example prior to mixing with the other ingredients. The lotion made in accordance with Example II is a further diluted and plasticized (due to the presence of glycerin) lotion.

EXAMPLE III

| Ingredient: | Quantity, grams |
|---|---|
| Liquid egg white | 960.00 |
| Water | 480.00 |
| Methylparaben | 1.25 |
| Propylparaben | .1 |

The process of mixing, beating, and separating the ingredients in this example is the same as described in Example I. This formula is similar to that of Example I except that the benzyl alcohol is omitted so that the lotion is useful as a coating for nuts, nutmeats, vitamins, minerals, or drug tablets, and as a protein for food use.

The chemical formulas for the preservatives and/or plasticizers described in the above examples are:

Benzyl alcohol—$C_6H_5CH_2OH$
Propylparaben (propyl p-hydroxybenzoate)—$C_{10}H_{12}O_3$
Methylparaben (methyl p-hydroxybenzoate)—$C_8H_8O_3$
Glycerin—$C_3H_8O_3$ The lotion of this invention is not limited to the specific compositions and methods given as examples. Other preservatives that may be used in suitable ranges of concentration, depending on their solubility and effectiveness for the above-described purposes, are:

(1) Other esters (ethyl, butyl, benzyl) of p-hydroxybenzoic acid in the same order of magnitude of concentration as the methyl and propyl esters used in the examples above;
(2) Parachlorometacresol, 0.05 to 0.1%;
(3) Parachlorometaxylenol, 0.05 to 0.1%;
(4) Dichlorometaxylenol, 0.05 to 0.1%;
(5) Phenyl ethers of ethylene glycol and propylene glycol, about 0.3%;
(6) Ortho-phenylphenol, 0.05 to 0.25%;
(7) Phenol, 0.01 to 0.5%;
(8) Chlorophenolic compounds such as hexachlorophene, dichlorophene, pentachlorophenol, and bithionol;
(9) Chlorohexidine, 0.02 to 0.5%;
(10) 3,4,4-trichlorocarbanilide;
(11) Cyclohexyl phenols;
(12) Benzalkonium chloride or other quaternary amonium germicides, 0.05 to 0.5%;
(13) Domiphen bromide;
(14) Essential oils such as eucalyptus, origanum, thyme, savory and rectified lemon grass oils;
(15) Aldehydes such as undecylenic and benzaldehydes;
(16) Phenols such as eugenol;
(17) Alcohols such as ethyl alcohol, octyl alcohol, geranoil, citronellal;
(18) Sorbic acid, 0.1 to 0.3%;
(19) Benzoic acid, 0.1 to 0.2%;
(20) Dehydroacetic acid, 0.5 to 1%;
(21) Phenylmercuric salts such as nitrate, benzoate, borate, and acetate in concentrations of 0.001 to 0.004%;
(22) Antibiotics such as streptomycin;
(23) Borax;
(24) Boric acid;
(25) Cinnamic acid;
(26) Salicylic acid;
(27) Salicylamide;
(28) Formaldehyde;
(29) Acriflavine;
(30) Proflavine;
(31) Vanillates;
(32) Propionates; and
(33) Polyols.

Although the lotion of this invention is described as being in a liquid form, it may also be colored, incorporated in sprays, emulsions, creams, powders, or wax sticks which are applied to the skin, hair, or other articles by employing suitable vehicles, as fully understood by those skilled in the art.

The advantages of the protein lotion of solution described above are as follows:

(1) When used as a cosmetic for the hair and liberally on the entire face, the lotion enhances the appearance of both the skin and the hair by providing a smoothing effect on the surface. It gives a natural "glow" to the skin without a "made-up" appearance. It gives greater body and manageability to the hair. These results are achieved without stickiness, oiliness, or flaking after the lotion dries following application.

(2) The local anesthetic and antiseptic qualities of benzyl alcohol are generally recognized, and combine with a soothing and protective effect of the water-soluble proteins in the lotion to produce a unique soothing and antiseptic compound for conditions of acne and minor skin irritations. The antiseptic and fungicidal properties of methylparaben and propylparaben are also generally recognized. The fungicidal effect of the methylparaben and propylparaben and the soothing, protective effect of the water-soluble proteins in the lotion combine to provide a soothing compound for athlete's foot and ringworm. In each of the above cases, the water-soluble protein dries on the area to which it is applied, thus closely holding the antiseptic and fungicidal agents to the skin for an extended period of time. This provides increased effectiveness over water or alcohol solutions of antiseptic or fungicidal compounds.

(3) It is well known that perspiration malodor is attributable almost solely to perspiration degradation caused by bacterial attack and decomposition. The antiseptic effect of the benzyl alcohol and the methylparaben and propylparaben inhibits or prevents degradation, thus serving as a deodorant. The topical anesthetic effect of the benzyl alcohol compound with the soothing effect of the protein solution makes it possible to use the lotion of this invention as an underarm deodorant immediately after the area is shaved. This often is not possible with usual deodorants and antiperspirants which contain metallic salts that often cause irritation of the shaved area. Moreover, the lotion of this invention will not damage clothing with which it might come in contact nor does any deposit of evaporated chemical solutions appear on clothing as occurs with many deodorants and antiperspirants now on the market.

(4) When nutmeats or nuts are coated with the formulation given in Example III, their eye appeal and marketability is much enhanced because of the gloss or semigloss effect provided by the dried water-soluble proteins. Food colors can easily be added to the lotion prior to application to further enhance eye appeal of such coated products. In addition, the protein solution, when dried on the product, acts as a sealer to preclude air from the product, and thus preserves product freshness.

(5) Coating of vitamin, mineral, or drug tablets with the lotion given in Example III provides an enhancing gloss or semigloss appearance to the tablets, and helps preserve them by sealing air from contact with the product.

(6) The amino acids present in the water-soluble proteins in the lotion, e.g., conalbumin and ovalbumin, and the other natural proteins found in egg white which are present in the lotion of Example III without the presence of the ovomucoid and ovomucin, provide a palatable, high-protein food which can be prepared for the market in many forms such as liquid, frozen, dried, baked, fried, or mixed with other foods to enhance their protein value for additional nutrition.

I claim:

1. The method of preparing a lotion of water-soluble proteins from liquid egg white which includes a mixture of proteins, the method comprising the steps of beating liquid egg white to produce a foam which includes some free liquid in which water-soluble proteins are dissolved, separating the liquid from the foam to form the lotion free of the proteins held in the foam, and mixing the water-soluble proteins dissolved in the free liquid with a minor proportion of benzyl alcohol.

2. The method according to claim 1 which also includes the step of mixing the water-soluble proteins in the free liquid with a plasticizer for the proteins.

3. The method according to claim 1 which includes the step of mixing the benzyl alcohol with the egg white during the beating of the egg white.

4. The method according to claim 1 which includes the step of diluting the egg white with water prior to beating the egg white.

5. The method according to claim 4 in which the egg white is diluted with water by about fifty percent by weight.

6. The method according to claim 1 which includes the step of adding benzyl alcohol to the liquid egg white in the range between about one percent to about three percent by weight of the liquid egg white.

7. The method according to claim 1 which includes the step of adding benzyl alcohol to the water-soluble proteins in the free liquid after the free liquid is separated from the foam.

8. The method according to claim 1 which also includes the step of adding methyl-p-hydroxybenzoate to the liquid egg white in the amount of about .1% to about .3% by weight of the liquid egg white and propyl-p-hydroxybenzoate in the amount of about .01% to about .03% by weight of the liquid egg white.

9. The method according to claim 6 which also includes the step of adding methyl-p-hydroxybenzoate to the liquid egg white in the amount of about .1% to about .3% by weight of the liquid egg white and propyl-p-hydroxybenzoate in the amount of about .01% to about .03% by weight of the liquid egg white.

10. The method of preparing a lotion of water-soluble proteins from liquid egg white which includes a mixture of proteins, the method comprising the steps of beating liquid egg white to produce a foam which includes some free liquid in which water-soluble proteins are dissolved, separating the liquid from the foam to form the lotion free of proteins held in the foam, and mixing the water-soluble proteins in the free liquid with a minor proportion of polyglycol.

11. The method according to claim 10 in which the polyglycol is glycerin.

References Cited

UNITED STATES PATENTS

| | | | |
|---|---|---|---|
| 1,924,990 | 8/1933 | Harris et al. | 424—70 |
| 2,043,657 | 6/1936 | Goncarova | 424—359 X |
| 2,189,380 | 2/1940 | Littlefield | 260—122 |
| 2,237,087 | 4/1941 | Littlefield et al. | 260—122 X |
| 3,340,153 | 9/1967 | Kast | 424—359 |

OTHER REFERENCES

American Perfumer & Cosmetics, vol. 78, No. 10, pp. 57–60, October 1963.

ALBERT T. MEYERS, Primary Examiner

VERA C. CLARKE, Assistant Examiner

U.S. Cl. X.R.

99—14, 126, 161; 106—124; 424—36, 61, 65, 70, 177, 359